United States Patent Office 2,833,127
Patented May 6, 1958

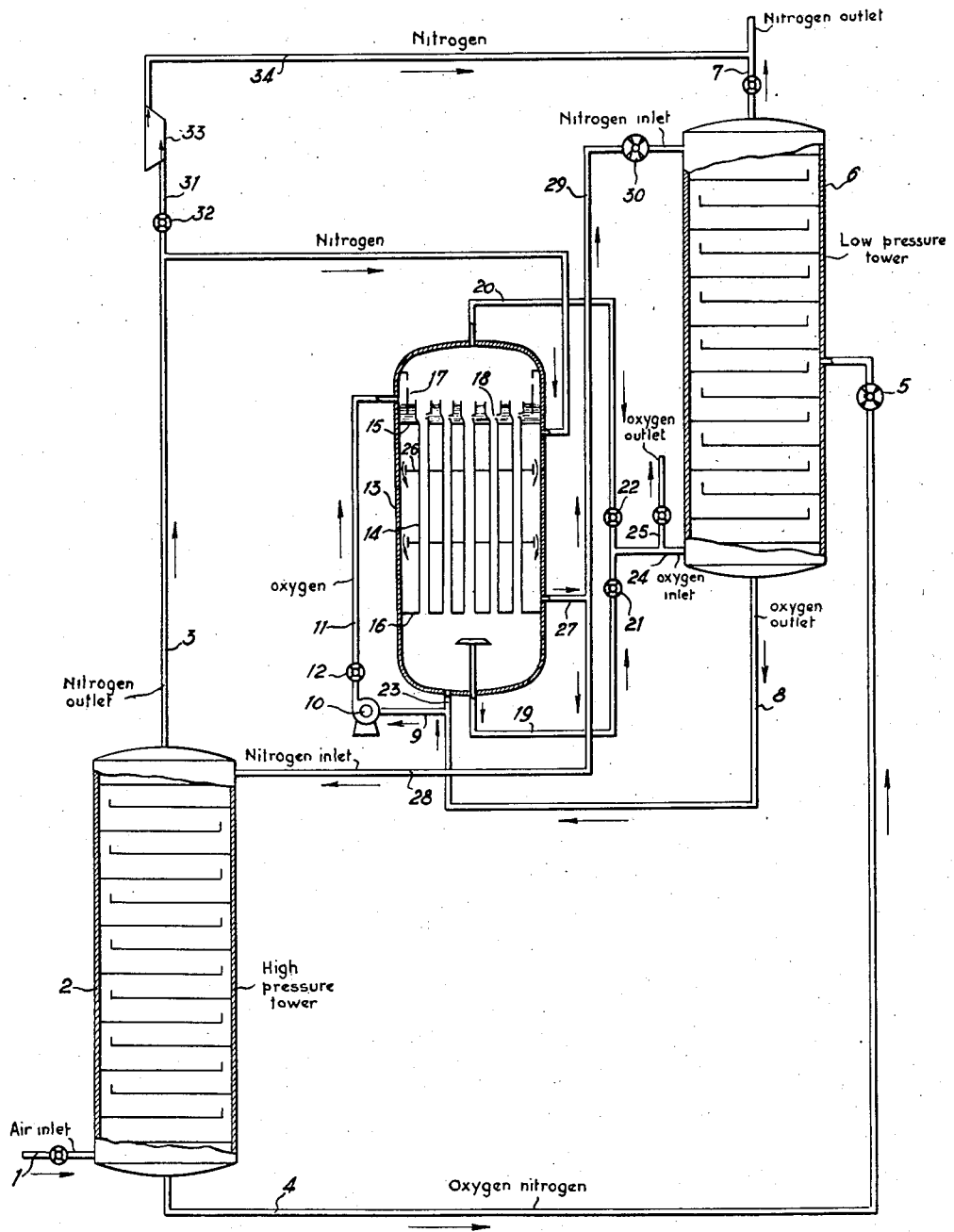

2,833,127

GAS SEPARATION CONTROL PROCESS

Henri Vesque and Gerard de Percin, Paris, France, assignors to L'Air Liquide, Societe Anonyme pour l'Etude et l'Exploitation des Procedes Georges Claude, Paris, France Application September 28, 1953, Serial No. 382,738

Claims priority, application France January 30, 1953

4 Claims. (Cl. 62—175.5)

The present invention concerns installations for the separation of gas mixtures by liquefaction and rectification at low temperature, in which an adjustable flow of liquid is vaporized by an indirect heat exchange with a gas which condenses under pressure, when cold is generated by expansion of a gaseous fraction taken on the gas which is condensing.

This is the case, especially, of installations for the separation of air which comprise two rectification columns, operating, one under a pressure of a few atmospheres and the other under a pressure substantially equal to the atmospheric pressure and in which gaseous nitrogen is taken from the top of the column under pressure to be expanded in a turbine, down to a pressure close to atmospheric pressure. The refrigerating power obtained is, in a general manner, a function of the rate of flow and of the pressure of the gaseous fraction subjected to expansion.

In an installation of this type, it is known to vary the refrigerating power by modifying the rate of flow of the gaseous fraction derived for expansion. This method, however, offers the drawback of modifying the amount of gas condensed in the vaporizer-condenser, and, consequently, the amount of reflux available for the rectification operation. The result is that if, for any reason, it becomes necessary to increase the refrigerating power of the installation, the increase in the amount of gas derived for expansion causes a decrease in the purity and in extraction efficiency for the products obtained.

The main object of the invention is to allow the adjustment of the refrigerating power of an installation of this type, without any modification of the purity or extraction efficiency for the products.

The process according to the invention consists in varying the refrigerating power by varying in the opposite direction the flow of the liquid subjected to vaporization by an indirect exchange of heat with the gas which is being condensed.

It was found, indeed, that any decrease in the rate of flow of the liquid to be vaporized causes an increase in the condensation pressure of the gas to be liquefied and, consequently an increase in the refrigerating power, without any need for increasing the importance of the gaseous fraction derived for expansion. Conversely, any increase in the rate of flow of liquid causes a decrease in the condensation pressure and, consequently, in the refrigerating power. For a constant refrigerating power, the importance of the gaseous derivation may be decreased by decreasing the rate of flow of the liquid subjected to vaporization.

This variation in the condensation pressure seems to be due to the fact that the decrease in the rate of flow of the liquid is unfavorable to the transfer of heat between the liquid being vaporized and the gas being condensed. The temperature of the liquid being vaporized remaining substantially constant, the temperature of the face of the wall for exchange in contact with the gas rises when the rate of flow of the liquid decreases, thus causing an increase in the condensation pressure.

One form of embodiment of the invention is described hereinafter and represented in the appended drawing, by way of example.

The figure shows, diagrammatically, an installation for the separation of air comprising two rectification columns, one at a high pressure, the other one at a low pressure.

The air supplied, previously compressed and cooled, and possibly charged with liquid, is introduced through the pipe 1 at the bottom of the high pressure column 2. The tower 2 operates under such temperature and pressure conditions that there is obtained, at the top, through the pipe 3, gaseous nitrogen containing at most 5% of oxygen.

There is tapped from the bottom of column 2, through pipe 4 a liquid rich in oxygen. This liquid is expanded through the cock 5 and introduced into the low pressure column at an intermediate point as shown in the drawing. Column 6 operates under such temperature and pressure conditions that there is obtained, at the top, through the pipe 7, gaseous nitrogen, substantially pure, which is one separation product.

There is tapped, at the bottom of column 6, through the pipe 8, a liquid containing 90% oxygen or more. This liquid oxygen is brought through the pipe 9 to a pump 10 which forces it through the pipe 11, provided with a valve 12, to the upper portion of a tubular vaporizer 13. This vaporizer 13 comprises several vertical tubes 14 which have, for instance, a length between 3 and 15 meters, and an inner diameter between 10 and 40 millimeters; said tubes 14 extend between plates 15 and 16. The liquid oxygen is distributed through a screen 17 and forms a liquid bath above the upper plate 15.

The upper end of each tube 14 extends beyond the plate 15 and is provided, slightly above said plate with at least one distributing hole, 18, through which liquid oxygen flows in a thin film along the inner wall of each tube 14. The vaporized oxygen is collected either at the bottom of the vaporizer through the pipe 19 or at the top through the pipe 20, or again through the pipes 19 and 20 simultaneously, by means of the cocks 21 and 22. The oxygen which, possibly, has not been vaporized, is tapped off the bottom of the vaporizer and brought to the suction side of the pump 10 through the pipe 23, to be sent back to the upper portion of the vaporizer.

Part of the oxygen thus vaporized is introduced through the pipe 24 into the low pressure column 6; another part is collected through the pipes 25 as a separation product.

The major part of gaseous nitrogen containing at most 5% of oxygen and arriving under pressure through the pipe 3, is introduced into the vaporizer 13 between the plates 15 and 16 and on the outside of the tubes 14; it condenses in contact with the tubes and flows along them. Horizontal baffles 26 prevent the liquid film thus flowing from becoming too thick and hindering the thermal exchange.

The nitrogen thus liquefied is tapped off the vaporizer 13 through the pipe 27. Part of this liquid nitrogen returns through the pipe 28 to the top of column 2 as a reflux liquid; the other part goes through the pipe 29, expanding through the cock 30, to the top of column 6 also as a reflux liquid.

A small portion of the gaseous nitrogen brought under pressure through the pipe 3 is derived through the pipe 31 provided with a valve 32 and expanded in a turbine 33; it then goes through the pipe 34 to unite with the nitrogen issuing from the low pressure column 6 through the pipe 7.

The refrigerating power of the installation is thus obtained by the expansion, with a production of outside work, in the turbine 33, of the gaseous nitrogen under pressure taken through the pipe 31 from the gas which condenses in the vaporizer 13. Heretofore, this refrigerating power was regulated by operating the valve 32. For increasing it, said valve was opened so as to admit more nitrogen under pressure to the turbine; simultaneously, however, the amount of nitrogen condensed in the vaporized decreased. The insufficient amount of washing liquid then caused a lowering of purity and in extraction efficiency for the separation products.

According to the invention, the refrigerating power is regulated by simply acting on the valve 12. If the valve 12 is closed, the amount of liquid oxygen circulating through the tubes in the vaporizer is decreased; the result is an increase in the condensation pressure of the gaseous nitrogen circulating outside the tubes 14 and, consequently, an increase in the operating pressure in column 2. The intake pressure to the turbine 33 thus increases, which causes an increase in the refrigerating power given by the expansion, since the outlet pressure, which is that in column 6, does not vary.

On the contrary, if the valve 12 is opened, the condensation pressure of nitrogen in the vaporizer decreases, and, consequently, the intake pressure to the turbine also decreases.

These variations in the refrigerating power are obtained with no appreciable variation in purity or in the extraction efficiency for the oxygen or nitrogen obtained from the installation.

The process according to the invention is applicable to installations comprising other types of vaporizers than thin film vaporizers. The vaporizing of the liquid may be effected, for instance, in tubes filled with liquid and vapour bubbles, provided the liquid is circulating and provided it is possible to regulate the flow of the circulating liquid.

What we claim is:

1. A process for separating a gaseous mixture into its constituents by successive fractionation at low temperature in a higher pressure zone and a lower pressure zone, in which are obtained, in the higher pressure zone, a liquid rich in a higher boiling constituent and a gas rich in a lower boiling constituent, and in the lower pressure zone, a liquid substantially pure in the higher boiling constituent and a gas substantially pure in the lower boiling constituent, comprising, vaporizing the liquid substantially pure in the higher boiling constituent by flowing it at an adjustable rate in indirect heat exchange with the gas rich in the lower boiling constituent, dividing the flow of said gas rich in the lower boiling constituent into two parts, liquefying a first part of said gas by said indirect heat exchange with the liquid substantially pure in the higher boiling constituent and feeding it to at least one of said fractionation zones, expanding with external work the second part of said gas to a constant low pressure and thereby producing cold, and varying the rate of flow of the liquid substantially pure in the higher boiling constituent in said indirect heat exchange to control the pressure in the higher pressure zone and thereby the cold production.

2. A process according to claim 1, wherein the liquid substantially pure in the higher boiling constituent is flown in a thin film upon a surface during the indirect heat exchange.

3. A process for separating air into its constituents by successive fractionation at low temperatures in a higher pressure zone and a lower pressure zone, in which are ovtained, in the higher pressure zone an oxygen-rich liquid and a nitrogen-rich gas, and in the lower pressure zone substantially pure liquid oxygen and substantially pure gaseous nitrogen, comprising vaporizing the substantially pure liquid oxygen by flowing it at an adjustable rate in indirect heat exchange with the nitrogen-rich gas, dividing the flow of the nitrogen-rich gas into two parts, liquefying the first part of the nitrogen-rich gas by said indirect heat exchange with the said substantially pure liquid oxygen and feeding it to at least one of said fractionation zones, expanding with external work the second part of the nitrogen-rich gas to a constant low pressure and thereby producing cold, and varying the rate of flow of the substantially pure liquid oxygen in said indirect heat exchange to control the pressure in the higher pressure zone and thereby the cold production.

4. A process eccording to claim 3, in which the substantially pure liquid oxygen is flown as a thin film upon a surface during the indirect heat exchange.

References Cited in the file of this patent

UNITED STATES PATENTS

| 2,380,417 | De Baufre | July 31, 1945 |
| 2,423,273 | Van Nuys | July 1, 1947 |
| 2,525,660 | Fausek et al. | Oct. 10, 1950 |
| 2,527,623 | Fausek et al. | Oct. 31, 1950 |
| 2,541,409 | Cornelius | Feb. 13, 1951 |
| 2,626,510 | Schilling | Jan. 27, 1953 |
| 2,650,482 | Lobo | Sept. 1, 1953 |

FOREIGN PATENTS

| 839,200 | Germany | May 19, 1952 |
| 861,853 | Germany | Nov. 13, 1952 |
| 884,203 | Germany | June 11, 1953 |